United States Patent
Bhatnagar et al.

(10) Patent No.: US 10,992,768 B1
(45) Date of Patent: Apr. 27, 2021

(54) RESUMING COPYING OF SNAPSHOTS FROM A STORAGE SYSTEM TO CLOUD STORAGE

(71) Applicant: EMC IP Holding Company LLC, Hopkinton, MA (US)

(72) Inventors: Anurag Bhatnagar, Bangalore (IN); Michael Anthony, Wilmington, MA (US); Meenakshi Rani, Bathinda (IN); Shanmuga Anand Gunasekaran, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/824,988

(22) Filed: Mar. 20, 2020

(51) Int. Cl.
G06F 13/00 (2006.01)
H04L 29/08 (2006.01)

(52) U.S. Cl.
CPC ................ H04L 67/2842 (2013.01)

(58) Field of Classification Search
CPC ... H04L 67/2842; H04L 43/10; H04L 43/106; H04L 43/16; H04L 43/04; H04L 43/12; G06F 3/061
USPC ................ 709/224, 213, 214, 232
See application file for complete search history.

(56) References Cited

U.S. PATENT DOCUMENTS

| | | | |
|---|---|---|---|
| 7,454,583 B2 * | 11/2008 | Yagisawa | G06F 11/1435 711/162 |
| 7,644,300 B1 * | 1/2010 | Rao | G06F 11/2082 714/5.1 |
| 7,779,423 B2 * | 8/2010 | Chokshi | H04L 41/0686 719/318 |
| 8,225,059 B2 * | 7/2012 | Nakamura | G06F 11/2094 711/162 |
| 8,706,833 B1 | 4/2014 | Bergant et al. | |
| 8,805,788 B2 * | 8/2014 | Gross, IV | G06F 11/1451 707/649 |

(Continued)

FOREIGN PATENT DOCUMENTS

EP 2391968 B1 5/2018

OTHER PUBLICATIONS

Amazon, "Overview of Amazon Web Services," Jan. 2020, 95 pages.

(Continued)

*Primary Examiner* — Kenneth R Coulter
(74) *Attorney, Agent, or Firm* — Ryan, Mason & Lewis, LLP

(57) ABSTRACT

An apparatus comprises a processing device configured to detect a request to resume copying of a snapshot of a storage volume from a storage system to cloud storage, to determine an original snapshot differential for the snapshot comprising differential data of the storage volume on the storage system, and to obtain checkpointing information for the snapshot characterizing a status of copying portions of the snapshot to the cloud storage. The processing device is also configured to generate a resume snapshot differential for the snapshot comprising portions of the snapshot to be copied to the cloud storage determined based at least in part on a comparison of the original snapshot differential with the checkpointing information characterizing the status of copying the one or more portions of the snapshot to the cloud storage. The processing device is further configured to resume copying of the snapshot utilizing the resume snapshot differential.

20 Claims, 8 Drawing Sheets

(56) References Cited

U.S. PATENT DOCUMENTS

| | | |
|---|---|---|
| 9,503,542 B1 | 11/2016 | Wang et al. |
| 9,563,517 B1 | 2/2017 | Natanzon et al. |
| 9,588,977 B1 | 3/2017 | Wang et al. |
| 9,959,280 B1 | 5/2018 | Whitehead et al. |
| 9,965,216 B1 | 5/2018 | Jaganathan et al. |
| 10,116,764 B1 | 10/2018 | Ayachit et al. |
| 10,154,112 B1 | 12/2018 | Anthony et al. |
| 10,452,453 B1 | 10/2019 | Kumar et al. |
| 10,496,324 B2 | 12/2019 | Meiri et al. |
| 10,496,599 B1 | 12/2019 | Haravu et al. |
| 10,536,522 B2 | 1/2020 | Bono et al. |
| 2007/0150587 A1* | 6/2007 | D'Alo ............... G06F 21/105 709/224 |
| 2007/0162716 A1* | 7/2007 | Yagisawa ........... G06F 11/2071 711/162 |
| 2008/0109822 A1* | 5/2008 | Chokshi ............... H04L 43/04 719/318 |
| 2010/0280996 A1* | 11/2010 | Gross, IV ........... G06F 11/1451 707/649 |
| 2011/0029748 A1* | 2/2011 | Nakamura ........... G06F 11/2094 711/162 |
| 2019/0235968 A1 | 8/2019 | Bono |
| 2019/0332488 A1 | 10/2019 | Bono et al. |
| 2020/0042404 A1 | 2/2020 | Kumar |

OTHER PUBLICATIONS

Netapp, "NetApp Snapshot Technology," 2011, 2 pages.
Dell EMC, "Dell EMC VMAX All Flash and VMAX3: Reliability, Availability, and Serviceability," Technical White Paper, Sep. 2019, 53 pages.
Dell Technologies, "Dell EMC Unity: Unisphere Overview," Technical White Paper, Feb. 2020, 41 pages.
Dell EMC, "Dell EMC Unity: Cloud Tiering Appliance (CTA)," Technical White Paper, Mar. 2019, 32 pages.
Dell EMC, "Dell EMC PowerMax: Family Overview," Technical White Paper, Sep. 2019, 51 pages.

\* cited by examiner

501

RESOURCE TYPE: LOGICAL UNIT (LUN)

SNAPSHOT SHIPPING STATUS:
D1, M1 (COMMITTED)
D2, M2 (COMMITTED)

510

| DATABASE (DB) VALIDATION | | | CACHE VALIDATION | | | CLOUD VALIDATION | | |
| --- | --- | --- | --- | --- | --- | --- | --- | --- |
| DATA STATE | METADATA STATE | VALIDATION STATUS | DATA STATE | METADATA STATE | VALIDATION STATUS | DATA STATE | METADATA STATE | VALIDATION STATUS |
| ENSURE VALID DB ENTRY WITH OID AND SIZE | ENSURE VALID DB ENTRY WITH OID AND SIZE | PASS | ENSURE NO CACHE FILES ARE AVAILABLE | ENSURE NO CACHE FILES ARE AVAILABLE | - | OBJECT AVAILABLE | OBJECT AVAILABLE | PASS |
| - | - | FAIL | - | - | - | - | - | - |

FIG. 5A

RESOURCE TYPE: LOGICAL UNIT (LUN)

SNAPSHOT SHIPPING STATUS: D3, M3 (IN PROGRESS)

| DATABASE (DB) VALIDATION | | | CACHE VALIDATION | | | CLOUD VALIDATION | | |
|---|---|---|---|---|---|---|---|---|
| DATA STATE | METADATA STATE | VALIDATION STATUS | DATA STATE | METADATA STATE | VALIDATION STATUS | DATA STATE | METADATA STATE | VALIDATION STATUS |
| NO RECORD FOUND | NO RECORD FOUND | PASS | D3: NO CACHED FILE | M3: NO CACHED FILE | PASS<br>-INITIALIZE CACHE/CLOUD DATA AND METADATA OBJECT<br>-IF END OF DATA COMMIT AND EXIT, ELSE CONTINUE | - | - | - |
| NO RECORD FOUND | NO RECORD FOUND | PASS | D3: ONE CACHED FILE (<5MB) | M3: NO CACHED FILE | PASS:<br>-INITIALIZE CACHE/CLOUD DATA AND METADATA OBJECT<br>-TRIM/DELETE DATA FILES<br>-IF END OF DATA COMMIT AND EXIT, ELSE CONTINUE | - | - | - |
| D3: PARTS UPLOADED | M3: PARTS UPLOADED | FAIL | D3: CACHED | M3: CACHED | PASS:<br>-INITIALIZE CACHE/CLOUD DATA AND METADATA OBJECT<br>-TRIM/DELETE DATA FILES<br>-IF END OF DATA COMMIT AND EXIT, ELSE CONTINUE | - | - | - |
| D3: PARTS UPLOADED | M3: COMMITTED | FAIL | - | - | - | - | - | - |
| D3: COMMITTED | M3: CACHED | PASS | ENSURE NO CACHE FILES ARE AVAILABLE. IF THERE ARE, FAIL THE TASK. | M3: CACHED | PASS<br>-INITIALIZE CACHE/CLOUD METADATA OBJECT<br>-ALREADY END OF DATA, COMMIT AND CONTINUE | OBJECT AVAILABLE | - | PASS |
| D3: COMMITTED | M3: PARTS UPLOADED | PASS | ENSURE NO CACHE FILES ARE AVAILABLE. IF THERE ARE, FAIL THE TASK. | M3: CACHED/PURGED | PASS<br>-INITIALIZE CACHE/CLOUD METADATA OBJECT<br>-GET UPLOADED PARTS (P1, P3) FOR METADATA<br>-ENSURE PURGE ON ALL UPLOADED PARTS (P3)<br>-UPLOAD FAILED INTERMITTENT PARTS (P2)<br>-ALREADY END OF DATA, COMMIT AND CONTINUE | OBJECT AVAILABLE | UPLOAD LIST (P1, P3) | PASS |
| D3: COMMITTED | M3: COMMITTED | PASS | ENSURE NO CACHE FILES ARE AVAILABLE. IF THERE ARE, FAIL THE TASK. | ENSURE NO CACHE FILES ARE AVAILABLE. IF THERE ARE, FAIL THE TASK | PASS<br>-CONTINUE | OBJECT AVAILABLE | OBJECT AVAILABLE | PASS |

RESUMING COPYING OF SNAPSHOTS FROM A STORAGE SYSTEM TO CLOUD STORAGE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (TO) operation requests for delivery to the storage systems. Storage controllers of the storage systems service such requests for IO operations. In some information processing systems, data storage utilizes cloud-based storage resources in addition to local storage resources of the storage systems. The use of cloud-based storage resources can provide various benefits, such as for efficient failure recovery, reduced costs, etc.

SUMMARY

Illustrative embodiments of the present disclosure provide techniques for resuming copying of snapshots from a storage system to cloud storage.

In one embodiment, an apparatus comprises at least one processing device comprising a processor coupled to a memory. The at least one processing device is configured to detect a request to resume copying of at least one snapshot of a storage volume from a storage system to cloud storage of at least one cloud external to the storage system, to determine an original snapshot differential for the at least one snapshot, the original snapshot differential comprising differential data of the storage volume on the storage system that forms the at least one snapshot, and to obtain checkpointing information for the at least one snapshot from a checkpointing cache associated with the at least one processing device, the checkpointing information characterizing a status of copying one or more portions of the at least one snapshot to the cloud storage. The at least one processing device is also configured to generate a resume snapshot differential for the at least one snapshot, the resume snapshot differential comprising at least one portion of the at least one snapshot that is to be copied to the cloud storage, the at least one portion of the at least one snapshot that is to be copied to the cloud storage being determined based at least in part on a comparison of the original snapshot differential with the checkpointing information characterizing the status of copying the one or more portions of the at least one snapshot to the cloud storage. The at least one processing device is further configured to resume copying of the at least one snapshot from the storage system to the cloud storage utilizing the resume snapshot differential.

These and other illustrative embodiments include, without limitation, apparatus, systems, methods and computer program products comprising processor-readable storage media.

BRIEF DESCRIPTION OF THE DRAWINGS

FIGS. 5A and 5B show scenarios and tables detailing validation of resume operations for a snapshot shipping operation in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
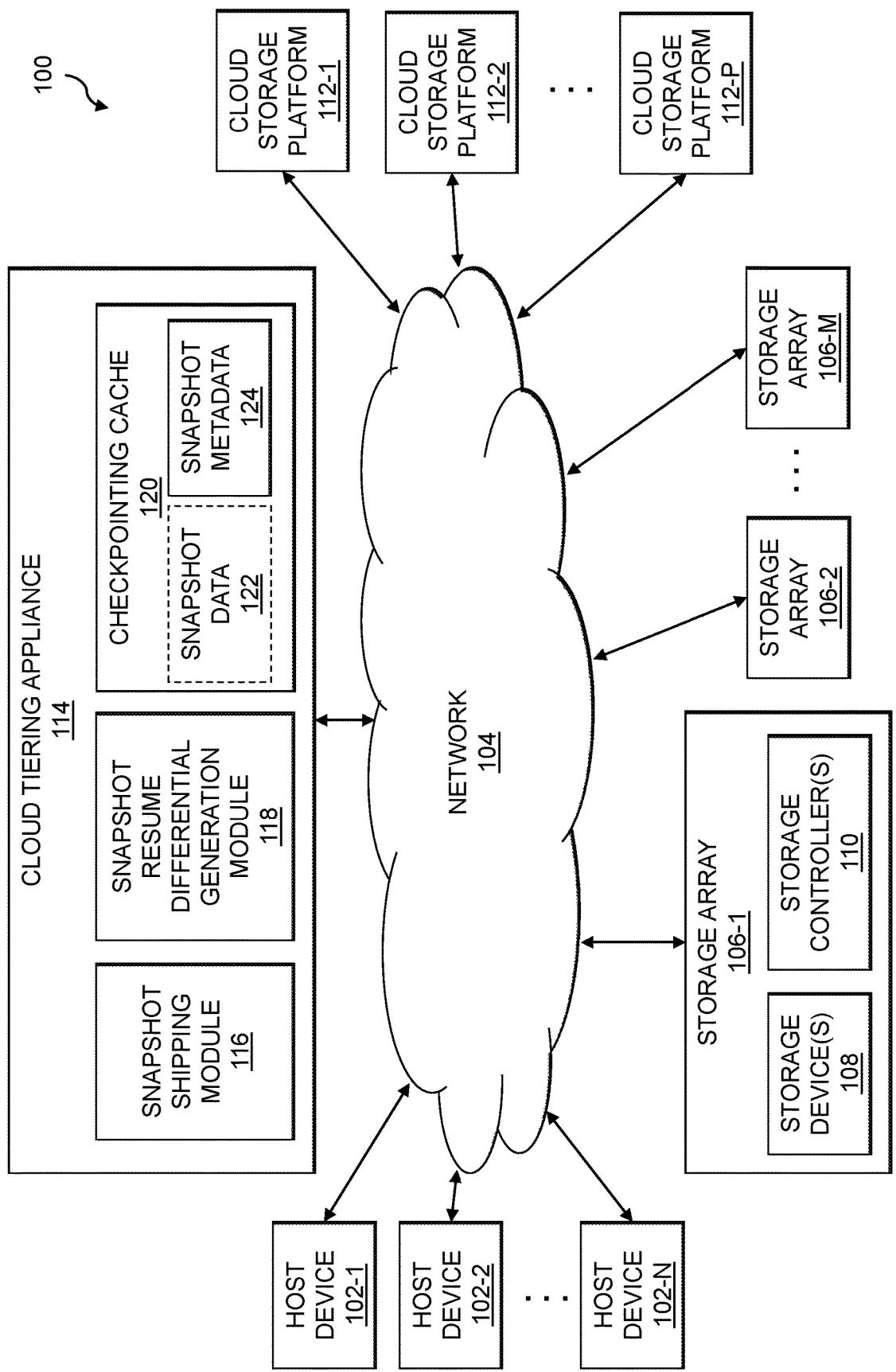
FIG. 1 is a block diagram of an information processing system configured with functionality for resuming copying of snapshots from a storage system to cloud storage in an illustrative embodiment.

FIG. 1 shows an information processing system 100 configured in accordance with an illustrative embodiment. The information processing system 100 comprises a plurality of host devices 102-1, 102-2, . . . 102-N (collectively, host devices 102). The host devices 102 communicate over a network 104 with a plurality of storage arrays 106-1, 106-2, . . . 106-M (collectively, storage arrays 106). The storage array 106-1, as shown in FIG. 1, comprises a set of storage devices 108 coupled to one or more storage controllers 110. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. Although not shown in FIG. 1 for clarity of illustration, other ones of the storage arrays 106-2 through 106-M are also assumed to comprise respective sets of storage devices coupled to one or more storage controllers. Also coupled to the network 104 is a set of cloud storage platforms 112-1, 112-2, . . . 112-P (collectively, cloud storage platforms 112), and a cloud tiering appliance (CTA) 114. The cloud storage platforms 112 are also referred to herein as cloud storage 112.

The host devices 102 illustratively comprise respective computers, servers or other types of processing devices configured to communicate with the storage arrays 106, cloud storage platforms 112, and CTA 114 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The CTA 114 of the system 100 is configured to move data between the storage arrays 106 and the cloud storage platforms 112. The CTA 114 is configured to move data, for example, by moving data files, snapshots or other data objects between the storage arrays 106 and the cloud storage platforms 112. A given data object may comprise a single data file, or multiple data files. A given data object may provide at least a portion of a snapshot that is being shipped or otherwise moved or copied from a given one of the storage arrays 106 to at least one of the cloud storage platforms 112. The CTA 114 permits administrators to automatically move data from the storage arrays 106 to and from the cloud storage platforms 112 based on user-configured policies. The cloud storage platforms 112 may include, for example, Dell® EMC® Elastic Cloud Storage (ECS), Microsoft® Azure®, Amazon® S3, IBM® Cloud Object Storage (COS) platforms, or any other available cloud storage infrastructures.

The CTA 114 in some embodiments comprises configurable data mover modules adapted to interact with the storage arrays 106 and the cloud storage platforms 112. At least one configuration file may be implemented in or otherwise associated with the CTA 114. The state of the configuration file may be controlled at least in part by a job scheduler implemented as part of the CTA 114. The job scheduler interacts with a data movement policy engine that is also part of the CTA 114 in this embodiment. In other embodiments, at least one of the job scheduler and the policy engine may be implemented at least in part externally to the CTA 114.

The CTA 114 can include at least one application programming interface (API) that permits an external component to control selection between various modes of operation. For example, the above-noted job scheduler can access the configuration file via such an API in order to control a mode of operation of the CTA 114. Additionally or alternatively, an application running on one or more of the host devices 102 can access the configuration file via the API in order to control the mode of operation of the CTA 114.

In some embodiments, the CTA 114 is configurable via the configuration file in a mode of operation in which a particular type of data movement between the storage arrays 106 and the cloud storage platforms 112 occurs for a given data object being utilized by an application running on one or more of the host devices 102. Furthermore, other embodiments can configure the CTA 114 in different modes of operation without the use of a configuration file. Thus, such a configuration file should not be viewed as a requirement.

The CTA 114 is illustratively coupled to the network 104 and configured to control transfer of data between the storage arrays 106 and the cloud storage platforms 112. The term "data movement" as used in this and other contexts herein is intended to be broadly construed, so as to encompass data relocation as well as other types of movement of data between the storage arrays 106 and the cloud storage platforms 112. A given data mover module can be implemented at least in part on storage arrays 106 or other storage platforms that implement at least portions of one or more storage tiers of a multi-tier storage system.

The CTA 114 may comprise a stub generator and a policy engine. Such components, as well as other components of the CTA 114 (e.g., the snapshot shipping module 116 and snapshot resume differential generation module 118 discussed in further detail below) are illustratively implemented at least in part in the form of software running on a processing platform or processing device that implements the CTA 114. The CTA 114 itself may be implemented in one or more containers of the processing platform, or using other arrangements of physical or virtual processing devices.

In one or more embodiments, the CTA 114 can be used to tier file data and archive block data to the cloud storage platforms 112, and to recall file data and restore block data to the storage arrays 106 from the cloud storage platforms 112. In some embodiments, the CTA 114 can be used to migrate repositories between the cloud storage platforms 112.

In a file tiering process, the policy engine of the CTA 114 is configured to identify files that fit specified criteria (e.g., as may be defined by a storage administrator or other authorized user), and the CTA 114 initiates movement of identified files on an originating storage array (e.g., storage array 106-1) to at least one of the cloud storage platforms 112. The stub generator places a stub file in the original file location on the originating storage array 106-1. According to an embodiment, when a user reads the stub, the CTA 114 recalls or passes the IO through the original file located in the cloud storage platform 112, and to the user, the file appears to be in its original location on the originating storage array 106-1.

In a block archiving process, the policy engine of the CTA 114 identifies block snapshots that fit specified criteria (e.g., as may be defined by a storage administrator or other authorized user), and the CTA 114 initiates archiving of the identified snapshots from an originating storage array (e.g., storage array 106-1) to at least one of the cloud storage platforms 112, leaving the identified snapshots in the originating storage array 106-1. After the identified snapshots are backed up to one or more of the cloud storage platforms 112, the original snapshots can be erased from the originating storage array 106-1 to free space. Users may initiate restoring of one or more snapshots to one or more of the storage arrays 106-1 via, for example, a host device 102.

According to an embodiment, the policy engine of the CTA 114 scans the snapshots and applies policy rules to each snapshot. If there are multiple rules in a policy, the policy engine of the CTA 114 applies the rules to a given snapshot until a rule evaluates to "true," and then takes the action associated with the rule, such as, for example, "archive" or "don't archive." As will be described in further detail below, the CTA 114 implements a snapshot shipping module 116 and snapshot resume differential generation module 118 to facilitate such snapshot shipping from the storage arrays 106 to the cloud storage platforms 112, including enabling pause and resume of snapshot shipping from the storage arrays 106 to the cloud storage platforms 112 as will be described in further detail elsewhere herein.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise Small Computer Systems Interface (SCSI) or Internet SCSI (iSCSI) commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as SCSI, iSCSI, Serial Attached SCSI (SAS) and Serial ATA (SATA). Numerous other interfaces and associated communication protocols can be used in other embodiments.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage arrays 106 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

Although illustratively shown as separate from the network 104 in the figure, at least portions of the storage arrays 106 may be considered part of the network 104 in some embodiments. For example, in embodiments in which the network 104 comprises at least one SAN, the storage arrays 106 may be viewed as part of the one or more SANs.

In some embodiments, the storage arrays 106 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As is apparent from the foregoing, terms such as "storage array" and "storage system" as used herein are intended to be broadly construed, and a given such storage array or storage system may encompass, for example, multiple distinct instances of a commercially-available storage array.

The storage devices 108 of the storage array 106-1 (as well as storage devices of the storage arrays 106-2 through 106-M) are configured to store data utilized by one or more applications running on one or more of the host devices 102. The storage devices 108 on the storage array 106-1 may be arranged in one or more storage pools. The storage devices 108 of the storage array 106-1 may implement logical units (LUNs) configured to store objects for users associated with the host devices 102. These objects can comprise files, blocks or other types of objects.

The host devices 102 and the CTA 114 interact with the storage arrays 106 utilizing read and write commands as well as other types of commands that are transmitted over the network 104. In some embodiments, the host devices 102 interact with the storage arrays 106 via the CTA 114. In other embodiments, the host devices 102 interact directly with the storage arrays 106. Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of the storage arrays 106.

Each IO operation is assumed to comprise one or more commands for instructing the storage arrays 106 to perform particular types of storage-related functions such as reading data from or writing data to particular logical storage volumes or other logical storage devices of the storage arrays 106. Such commands are assumed to have various payload sizes associated therewith, and the payload associated with a given command is referred to herein as its "command payload."

A command directed by a given one of the host devices 102 (e.g., host device 102-1) or the CTA 114 to a given one of the storage arrays 106 (e.g., storage array 106-1) is considered an "outstanding" command until such time as its execution is completed in the viewpoint of the host device 102-1 or CTA 114, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in one or more of the storage arrays 106 to include different portions of one or more physical storage devices. The storage devices 108 of storage array 106-1, for example, may therefore be viewed as comprising respective LUNs or other logical storage volumes. Logical storage devices are also referred to herein as simply "logical devices."

Each of the host devices 102 or CTA 114 illustratively has multiple paths to the storage arrays 106 via the network 104. For example, at least one of the storage devices 108 of storage array 106-1 is assumed to be visible to at least one of the host devices 102 (e.g., host device 102-1) or CTA 114 on a given one of the paths, although numerous other arrangements are possible. A given one of the storage devices 108 may be accessible to the given host device 102-1 or CTA 114 over multiple paths. Different ones of the host devices 102 or the CTA 114 can have different numbers and types of paths to the storage arrays 106 and their associated sets of storage devices.

Different ones of the storage devices of the storage arrays 106 illustratively exhibit different latencies in processing of IO operations. In some cases, the same storage device may exhibit different latencies for different ones of multiple paths over which that storage device can be accessed from a given one of the host devices 102 or the CTA 114.

The host devices 102, network 104, storage arrays 106, cloud storage platforms 112 and CTA 114 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement portions of the system 100 in illustrative embodiments will be described in more detail below in conjunction with FIGS. 6 and 7.

The host devices 102, the storage arrays 106, cloud storage platforms 112 and CTA 114 may be implemented on respective distinct processing platforms, although numerous other arrangements are possible. For example, in some embodiments at least portions of host devices 102, storage arrays 106, cloud storage platforms 112 and CTA 114 are implemented on the same processing platform. The storage arrays 106 can therefore be implemented at least in part within at least one processing platform that implements at least a subset of the host devices 102, cloud storage platforms 112 and CTA 112.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106 and/or CTA 114. The storage arrays 106 and the CTA 114 can be similarly distributed across multiple data centers.

In some embodiments, the host devices 102 comprise respective sets of IO queues and multi-path input/output (MPIO) drivers. In addition or alternatively, the CTA 114 may comprise IO queues and an MPIO driver. The MPIO drivers collectively comprise a multi-path layer of the host devices 102 and/or CTA 114. The multi-path layer provides functionality for using multiple storage targets to execute threads for reading and writing snapshots in block archiving or restoring processes. Such functionality is provided at least in part using respective instances of path selection logic implemented within the MPIO drivers.

The MPIO drivers may comprise, for example, otherwise conventional MPIO drivers, such as PowerPath® drivers from Dell EMC, suitably modified to provide the functionality described herein. Other types of MPIO drivers from other driver vendors may be suitably modified to incorporate or otherwise provide the functionality disclosed herein.

The MPIO drivers are configured to select IO operations from a corresponding set of IO queues for delivery to one or more of the storage arrays 106 over the network 104. The sources of the IO operations stored in the set of IO queues illustratively include respective processes of one or more applications executing on the host devices 102. Other types of sources of IO operations may be present in a given implementation of system 100.

The paths over which the IO operations are sent from the host devices 102 or the CTA 114 to the storage arrays 106 illustratively comprise paths associated with respective initiator-target pairs, with each initiator comprising a bus adaptor (BA) or other initiating entity of the host device 102 or CTA 114 and each target, as noted above, comprising a port or other targeted entity corresponding to one or more of the storage devices of one or more of the storage arrays 106. As noted above, the storage devices illustratively comprise LUNs or other types of logical storage devices, and the targets can be manually selected by a user when configuring, for example, the CTA 114.

In selecting particular ones of the paths for delivery of the IO operations to the storage arrays 106, the path selection logic of the MPIO driver illustratively implements a path selection algorithm that selects particular ones of the paths at least in part as a function of path information such as device BA and storage array port, with the path selection algorithm being configured to balance the IO operations over the paths or to achieve other load balancing or performance goals.

Selecting a particular one of multiple available paths for delivery of a selected one of the IO operations of the set of IO queues is more generally referred to herein as "path selection." Path selection as that term is broadly used herein can in some cases involve both selection of a particular IO operation and selection of one of multiple possible paths for accessing a corresponding logical device of one or more of the storage arrays 106. The corresponding logical device illustratively comprises a LUN or other logical storage volume to which the particular IO operation is directed.

A given retry of a failed IO operation under such a path selection algorithm can select a path having a different device BA and storage array port for a given retry than that of the path selected for the original failed IO operation.

The paths between the host devices 102 and one or more of the storage arrays 106, or between the CTA 114 and one or more of the storage arrays 106 can change over time. For example, the addition of one or more new paths from host devices 102 or the CTA 114 to one or more of the storage arrays 106 or the deletion of one or more existing paths from the host devices 102 or the CTA 114 to one or more of the storage arrays 106 may result from respective addition or deletion of at least a portion of the storage devices of one or more of the storage arrays 106. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation. In these and other situations, path discovery scans may be repeated as needed in order to discover the addition of new paths or the deletion of existing paths.

For example, a storage system may include first and second storage arrays, with data being migrated from the first storage array to the second storage array prior to removing the first storage array from the storage system. In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array so as to be available for data recovery in the event of a failure involving the production storage array.

A given path discovery scan can be performed utilizing known functionality of conventional MPIO drivers, such as PowerPath® drivers. These and other references to Power-Path® herein are presented by way of illustrative example only, and should not be construed as limiting in any way.

The path discovery scan in some embodiments may be further configured to identify one or more new LUNs or other logical storage volumes associated with the one or more new paths identified in the path discovery scan, as well as the identification of targets of the storage arrays 106. The path discovery scan may comprise, for example, one or more bus scans which are configured to discover the appearance of any new LUNs that have been added to one or more of the storage arrays 106 as well to discover the disappearance of any existing LUNs that have been deleted from one or more of the storage arrays 106.

The MPIO drivers in some embodiments comprise user-space portions and kernel-space portions. The kernel-space portion of a given one of the MPIO drivers may be configured to detect one or more path changes of the type mentioned above, and to instruct the user-space portion of the given MPIO driver to run a path discovery scan responsive to the detected path changes. Other divisions of functionality between the user-space portion and the kernel-space portion of the given MPIO driver are possible.

For each of one or more new paths identified in the path discovery scan, the host devices 102 or CTA 114 may be configured to execute a registration operation for that path. The registration operation for a given new path illustratively provides notification to one or more of the storage arrays 106 that the host devices 102 or CTA 114 has discovered the new path.

It is assumed that the CTA 114 comprises block archiving/restoring control logic and that the storage controllers of the storage arrays 106 (e.g., storage controllers 110 of storage array 106-1) each comprise a snapshot generator. The block archiving/restoring control logic controls performance of the above-noted block archiving or restoring processes. The snapshot generator can be used, for example, to generate block snapshots of one or more storage volumes that are subject to back-up operations to one or more cloud storage platforms 112 in conjunction with a wide variety of different block archiving scenarios.

The snapshots generated by the storage controllers of the storage arrays 106 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for archiving in the system 100 may comprise a set of one or more LUNs or other storage volumes of at least one of the storage arrays 106. Each such LUN or other storage volume is assumed to comprise at least a portion of a physical storage space of one or more of the storage devices of the storage arrays 106.

The CTA 114 includes a snapshot shipping module 116 that is configured to facilitate snapshot shipping from the storage arrays 106 to the cloud storage platforms 112. A given one of the storage arrays, such as storage array 106-1, may have a particular logical storage volume (e.g., a LUN (X)) with a set of snapshots (e.g., snapshots 1 through 5, where snapshot 1 is the oldest snapshot and snapshot 5 is the newest snapshot). Assume that some of the set of snapshots on the storage array 106-1 (e.g., snapshots 1, 3 and 5) have attributes set indicating that they should be archived to a given one of the cloud storage platforms 112 (e.g., cloud storage platform 112-1). The storage array 106-1 (e.g., via one or more of the storage controllers 110) can initiate a call into the CTA 114 (e.g., to the snapshot shipping module 116) to initiate archiving or snapshot shipping of such snapshots. The call may include invoking an application programming interface (API) such as a representational state transfer (REST) API exposed by the CTA 114.

The CTA 114, via the snapshot shipping module 116, requests (e.g., using a REST API) that the data of the snapshots 1, 3 and 5 be made available over an interface between the storage array 106-1 and the CTA 114 (e.g., an iSCSI interface). The CTA 114 also issues a request (e.g., using a REST API) for snapshot differential information for the snapshots 1, 3 and 5 to be archived to the cloud storage platform 112-1. The snapshot differential information may include various snapshot metadata, such as a volume size, block offset with data, etc. The CTA 114 via the snapshot shipping module 116 then utilizes the interface with the storage array 106-1 (e.g., the iSCSI interface) to read the snapshot data for snapshots 1, 3 and 5. The CTA 114 via the snapshot shipping module 116 then provides the snapshot data to the cloud storage platform 112-1 using a cloud API.

The cloud storage platform 112-1 may maintain a catalog for the logical storage volume (e.g., for LUN(X)), such as an object 1 for snapshot 1, an object 2 for snapshot 2, and an object 3 for snapshot 3. Each of the objects 1-3 may include metadata and data of the associated snapshot. The catalog for LUN(X) may include entries for each of the snapshots 1, 3 and 5 shipped to the cloud storage platforms 112. A first entry for snapshot 1 includes a first delta, a common base (e.g., for all the snapshots of LUN(X) shipped to the cloud storage platform 112-1), the first object, and an associated timestamp. A second entry for snapshot 3 includes a third delta, the second object, and an associated timestamp. A third entry for snapshot 5 includes a fifth delta, the third object, and an associated timestamp.

The snapshot shipping module 116 is further configured to enable pause and resume of the snapshot shipping utilizing snapshot resume differentials generated by the snapshot resume differential generation module 118. To copy a given snapshot from a given one of the storage arrays 106 (e.g., storage array 106-1) to a given one of the cloud storage platforms 112 (e.g., cloud storage platform 112-1), the snapshot shipping module 116 may copy data of the given snapshot from the storage array 106-1 to a checkpointing cache 120 as snapshot data 122. This is optional, however, and thus the snapshot data 122 is shown in dashed outline in FIG. 1. By copying the snapshot data 122 to the checkpointing cache 120, pause and resume of snapshot shipping may be done more efficiently (e.g., as the snapshot data 122 already stored in the checkpointing cache 120 need not be re-read from the storage array 106-1). For example, where the given snapshot is to be stored in encrypted and/or compressed form in the cloud storage platform 112-1, the CTA 114 may perform such encryption and/or compression and store the snapshot data 122 in the checkpointing cache 120 in encrypted and/or compressed form. The checkpointing cache 120 also stores snapshot metadata 124, also referred to herein as checkpointing information, that characterizes the status of copying one or more portions of the given snapshot from the storage array 106-1 to the cloud storage platform 112-1.

The snapshot shipping module 116 is configured to detect a request to resume copying of the given snapshot from the storage array 106-1 to the cloud storage platform 112-1. The request may be submitted by the storage array 106-1, the cloud storage platform 112-1, one or more of the host devices 102, the CTA 114, etc. The snapshot resume differential generation module 118 is configured to determine an original snapshot differential for the given snapshot, where the original snapshot differential comprises differential data of the storage volume on the storage array 106-1 that forms the given snapshot (e.g., where the given snapshot may be copied or shipped to the cloud storage platform 112-1 by only copying differential data relative to a previous snapshot of the storage volume that is already stored in the cloud storage platform 112-1).

The snapshot resume differential generation module 118 is also configured to obtain checkpointing information (e.g., the snapshot metadata 124) for the given snapshot from the checkpointing cache 120, where the checkpointing information characterizes a status of copying one or more portions of the given snapshot to the cloud storage platform 112-1. The snapshot resume differential generation module 118 is also configured to generate a resume snapshot differential for the given snapshot, where the resume snapshot differential comprises at least one portion of the given snapshot that is to be copied to the cloud storage platform 112-1 (e.g., which may be stored in the checkpointing cache 120 as the snapshot data 122). The at least one portion of the given snapshot that is to be copied to the cloud storage platform 112-1 is determined based at least in part on a comparison of the original snapshot differential with the checkpointing information characterizing the status of copying the one or more portions of the given snapshot to the cloud storage platform 112-1. The snapshot shipping module 116 is further configured to resume copying of the given snapshot from the storage array 106-1 to the cloud storage platform 112-1 utilizing the resume snapshot differential.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 106, cloud storage platforms 112 and CTA 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process for resuming copying of snapshots from a storage system to cloud storage will now be described in more detail with reference to the flow diagram of FIG. 2. It is to be understood that this particular process is only an example, and that additional or alternative processes for resuming copying of snapshots from a storage system to cloud storage may be used in other embodiments.

In this embodiment, the process includes steps 200 through 208. These steps are assumed to be performed by the CTA 114 utilizing the snapshot shipping module 116 and the snapshot resume differential generation module 118. The process begins with step 200, detecting a request to resume copying of at least one snapshot of a storage volume from a storage system (e.g., storage array 106-1) to cloud storage of at least one cloud external to the storage system (e.g., one or more of the cloud storage platforms 112). In step 202, an original snapshot differential for the at least one snapshot is determined. The original snapshot differential comprises differential data of the storage volume on the storage system that forms the at least one snapshot. The storage volume may comprise one or more storage devices of the storage system, a given LUN provided by at least one of the one or more storage devices of the storage system, a consistency group comprising a set of two or more LUNS provided by at least one of the one or more storage devices of the storage system, an access-restricted storage group comprising a set of two or more LUNs provided by at least one of the one or more storage devices of the storage system where access to the storage group is limited to one or more designated host devices, etc.

Checkpointing information for the at least one snapshot is obtained in step 204 from a checkpointing cache (e.g., checkpointing cache 120) associated with the CTA 114. The checkpointing information characterizes a status of copying one or more portions of the at least one snapshot to the cloud storage. A resume snapshot differential for the at least one snapshot is generated in step 206. The resume snapshot differential comprises at least one portion of the at least one snapshot that is to be copied to the cloud storage. The at least one portion of the at least one snapshot that is to be copied to the cloud storage is determined based at least in part on a comparison of the original snapshot differential with the checkpointing information characterizing the status of copying the one or more portions of the at least one snapshot to the cloud storage.

In some embodiments, the CTA 114 validates a state of the checkpointing information in the checkpointing cache prior to generating the resume snapshot differential in step 206. Validating the state of the checkpointing information in the checkpointing cache may comprise, for a given portion of data of the at least one snapshot: determining whether the given portion of the data of the at least one snapshot is at least one of cached in the checkpointing cache, uploaded to the cloud storage, and committed to the cloud storage; and determining whether metadata associated with the given portion of the data of the at least one snapshot is at least one of cached in the checkpointing cache, uploaded to the cloud storage, and committed to the cloud storage. In step 208, copying of the at least one snapshot from the storage system to the cloud storage is resumed utilizing the resume snapshot differential.

In some embodiments, step 200 includes obtaining, from the cloud storage, information characterizing one or more cloud object parts stored in the cloud storage for the at least one snapshot. The information characterizing the one or more cloud object parts stored in the cloud storage for the at least one snapshot may comprise, for a given one of the one or more cloud object parts, a size of the given cloud object part. The checkpointing information characterizing the status of copying the one or more portions of the at least one snapshot to the cloud storage may comprise a size of a given one of the one or more portions of the at least one snapshot. Step 206 may include comparing the size of the given cloud object part and the size of the given portion of the at least one snapshot. Responsive to determining that the size of the given cloud object part is not the same as the size of the given portion of the at least one snapshot, the given cloud object part may be removed from the cloud storage and the given portion of the at least one snapshot may be added to the resume snapshot differential. Responsive to determining that the size of the given cloud object part is the same as the size of the given portion of the at least one snapshot, the checkpointing information in the checkpointing cache may be updated to indicate that the given portion of the at least one snapshot has been successfully copied to the cloud storage and the given portion of the at least one snapshot may be removed from the resume snapshot differential.

In some embodiments, the at least one snapshot is copied from the storage system to the cloud storage utilizing at least one multi-part upload associated with at least one upload identifier, and step 200 includes obtaining a multi-part upload list from the cloud storage. The multi-part upload list indicates at least a subset of the portions of the at least one snapshot that have been copied to the cloud storage.

The CTA 114, as described above, may store in the checkpointing cache at least a portion of data of the at least one snapshot (e.g., snapshot data 122) copied from the storage system prior to shipping that data from the CTA 114 to one or more of the cloud storage platforms 112. Copying of the at least one snapshot from the storage system to the cloud storage may comprise compressing the differential data of the storage volume, and the portion of the data of the at least one snapshot stored in the checkpoint cache may comprise compressed data of the at least one snapshot. Copying of the at least one snapshot from the storage system to the cloud storage may also or alternatively comprise encrypting the differential data of the storage volume, and the portion of the data of the at least one snapshot stored in the checkpoint cache may comprise encrypted data of the at least one snapshot.

Figure 2:
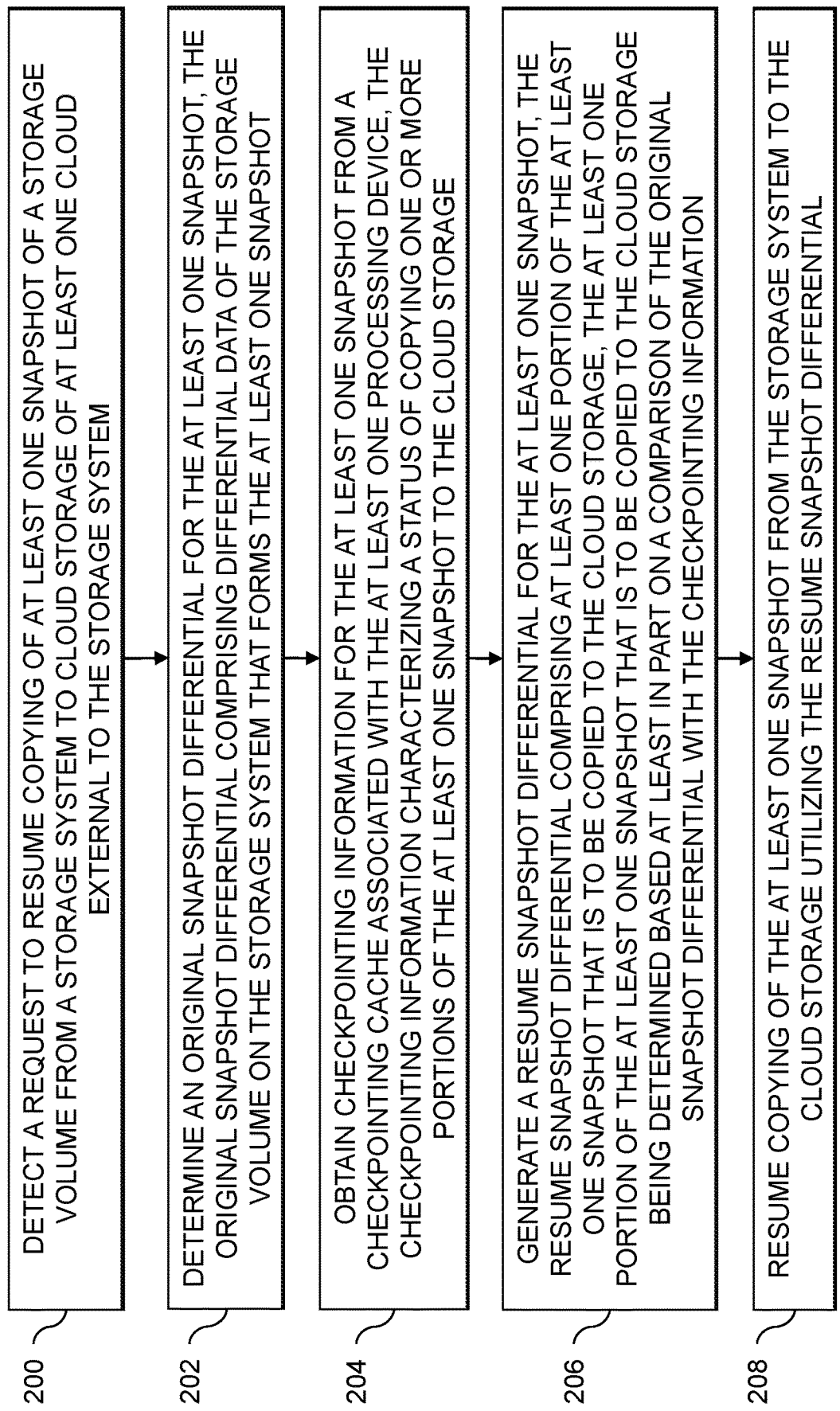
FIG. 2 is a flow diagram of a process for resuming copying of snapshots from a storage system to cloud storage in an illustrative embodiment.

The particular processing operations and other system functionality described in conjunction with the flow diagram of FIG. 2 and other flow diagrams and processes disclosed herein are presented by way of illustrative example only, and should not be construed as limiting the scope of the disclosure in any way. Alternative embodiments can use other types of processing operations to implement functionality for resuming copying of snapshots from a storage system to cloud storage. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Figure 3:
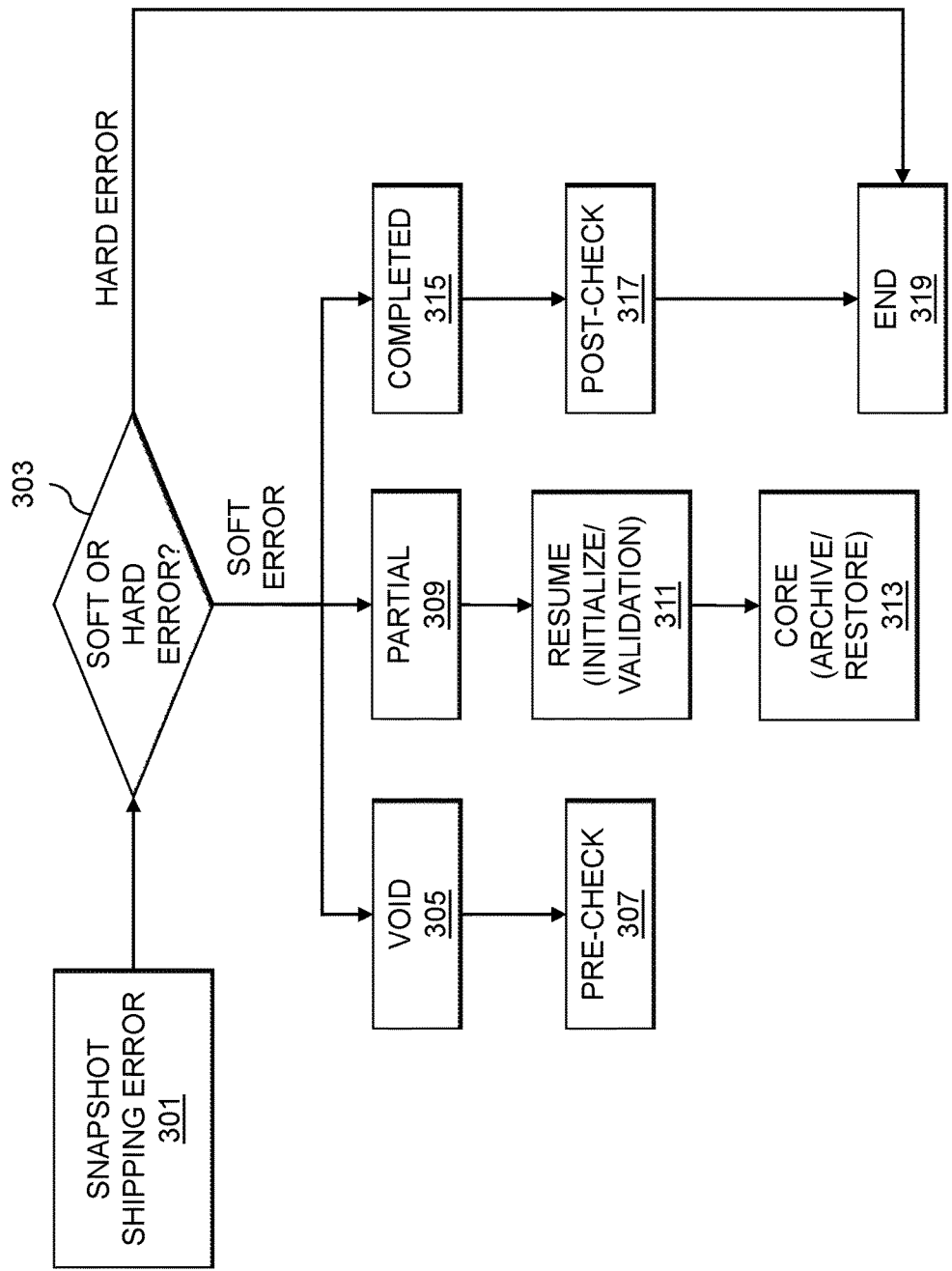
FIG. 3 is a flow diagram for resuming copying of a snapshot to cloud storage using a cloud tiering appliance in an illustrative embodiment.

FIG. 3 illustrates a process flow for resuming snapshot shipping. The process flow begins in step 301 with a request to resume snapshot shipping following a snapshot shipping error. The snapshot shipping error in step 301 may be the result of a validation error, a network error, a memory corruption error (e.g., a core dump resulting from a segmentation fault or illegal instruction error), operating system issues (e.g., Linux issues associated with memory, disk, task kill, reboot, etc.). In step 303, a determination is made as to whether the snapshot shipping error in step 301 is a "hard" or "soft" error. If it is determined in step 303 that the error is a "hard" error, then snapshot shipping is not resumable and the FIG. 3 process ends in step 319. If it is determined in step 303 that the error is a "soft" error, then snapshot shipping may be resumable and the FIG. 3 process continues with one of step 305, 309 and 315 for different parts of a snapshot.

In some embodiments, snapshots are shipped to cloud storage utilizing multi-part uploads, which enables uploading of a large object in multiple parts. For example, a snapshot or portion thereof may be uploaded from the CTA 114 to cloud storage on one or more of the cloud storage platforms 112 using a multi-part upload. The multi-part upload is initiated and the parts are uploaded. Once all parts of the multi-part upload are completed, the parts may be joined to form a single object in the cloud storage. In the FIG. 3 example, it is assumed that the snapshot (or at least a portion thereof) being shipped is uploaded in multiple parts denoted P1 through P10. It is further assumed that: P1, P2 and P5 were successfully shipped to cloud storage; P3 shipping is intermittent (e.g., P3 data has been uploaded to the cloud storage, but a cache metadata update has failed); P4 is in progress (e.g., P4 data upload to the cloud storage has not completed); and P6 through P10 are remaining (e.g., not yet uploaded to the cloud storage). For P4 that is in progress, the FIG. 3 process flow proceeds to step 305 where the upload is voided and the snapshot shipping moves to a pre-check status in step 307. For P3 that is intermittent, the FIG. 3 process flow proceeds to step 309 where the upload is partial. The snapshot shipping then moves to a resume status in step 311 (which includes initialization and validation described in further detail below) and then to a core status in step 313 (which includes archive and restore as described in further detail below). For P1, P2 and P5 that were successful shipped to the cloud storage, the FIG. 3 process flow proceeds to step 315 where the upload is completed and the snapshot shipping moves to a post-check status in step 317.

In some embodiments, referred to below as Approach 1, both data files and metadata files are cached locally on the CTA during snapshot shipping or archive to cloud storage. In other embodiments, referred to as Approach 2, the metadata files are cached locally on the CTA but the data files are not.

For Approach 1, the resume operation proceeds as follows. First, a multi-part upload list is obtained using an upload identifier (ID), where the multi-part upload list is [P1, P2, P3, P5]. P4, as noted above, is assumed to be in progress and voided, while P6 through P10 are remaining. Next, cloud object parts are compared with the cached metadata in the CTA. If the cloud object is less than the cached metadata file, this results in an invalid status. If the cloud object is greater than or equal to the cached metadata file, this results in a valid status. The cached files in the CTA may be verified (e.g., using a checksum, such as an MD5SUM). Cached data files are uploaded to the cloud storage from the CTA (if the associated parts are not equal). To do so, a resume snapshot differential is utilized. The resume snapshot differential, also referred to as "RESUME_SNAPDIFF" is determined by multiplexing the original snapshot differential (e.g., for the snapshot being shipped to the cloud storage) and the cached metadata in the CTA.

Figure 4:
FIG. 4 shows a table of resumable states for a snapshot shipping operation in an illustrative embodiment.

FIG. 4 shows a table 400 illustrating resumable states for a snapshot shipping operation. The table 400 illustrates the state (e.g., 0 or 1) of data files and metadata files, which each may be cached (e.g., on the CTA), uploaded (e.g., to the cloud storage) and committed (e.g., verified upload to the cloud storage and no longer cached on the CTA). In the table 400, "0" indicates no or false, while "1" indicates yes or true. The first row of table 400 is the scenario where data and metadata files are not cached, uploaded or committed. This is a resumable state, and corresponds to normal operation of snapshot shipping. The second row of the table 400 is the scenario where data files are committed but metadata files are uploaded but not committed. This is a resumable state, where the metadata is to be committed. The third row of the table 400 is the scenario where the data files are committed and the metadata files are cached on the CTA. This is a resumable scenario, where the metadata is to be committed (e.g., the metadata files are uploaded to cloud storage and then committed). The fourth row of the table 400 is the scenario where the data files are committed, and the metadata files are both cached on the CTA and uploaded to cloud storage. This is a resumable scenario where only the metadata is to be committed.

The fifth row of the table 400 is the scenario where the data files are uploaded but not committed and the metadata files are cached but not uploaded or committed. This is a resumable scenario where the data and metadata are to be committed (e.g., where the metadata files are to be uploaded and then committed, and where the data files are to be committed). The sixth row of the table 400 is the scenario where the data files are cached on the CTA, and the metadata files are not cached on the CTA. This a resumable scenario where the data and metadata are to be committed (e.g., where the data files are to be uploaded then committed, and where the metadata files are to be cached on the CTA then uploaded and committed). The seventh row of the table 400 is the scenario where the data files and the metadata files are cached on the CTA. This a resumable scenario where the data and metadata are to be committed (e.g., where the data files and metadata files are to be uploaded then committed). The eighth row of the table 400 is the scenario where the data files are cached and uploaded and the metadata files are cached. This a resumable scenario where the data and metadata are to be committed (e.g., where the data files are to be committed and the metadata files are to be uploaded then committed).

The resume process may be initiated on the failed task, where the resume process includes generating the original snapshot differential file from the originating storage array using a source block server management API call. As an example, assume that the original snapshot differential file includes 100 megabytes (MB) of snapshot data. Next, all the metadata files (e.g., cached on the CTA or uploaded to the cloud storage) for the failed task are retrieved. As an example, assume that 30 MB of the snapshot data has already been shipped to the cloud storage, and that 10 MB of the snapshot data is cached on the CTA. The resume snapshot differential file is then generated as the difference between the original snapshot differential file and the already cached/uploaded snapshot data defined in the metadata files. Continuing the example above, there would be 60 MB of snapshot data left to be shipped to the cloud storage from the originating storage array.

The resume functionality next validates the CTA state by doing various checks at the database (DB) level, cached files level, and cloud object level as detailed in FIGS. 5A and 5B. The DB and cache are both maintained on the CTA. The DB may be viewed as providing a pointer to data, where the cache stores the actual data. When resuming snapshot shipping, the DB is first validated to determine what the DB says about the state of the cached data. The actual state of the cached data is then validated.

FIG. 5A illustrates such validation for scenario 501, where the resource type is a logical unit (LUN) and the snapshot shipping status is data file D1 and metadata file M1 are committed, or data file D2 and metadata file M2 are committed. Table 510 illustrates the DB, cache and cloud validations, each of which includes a data state, metadata state and validation status. The first row corresponds to a "pass" validation status, where DB validation data state and metadata state both ensure that there is a valid DB entry with an object identifier (OD) and size, cache validation data state and metadata state both ensure that no cache files are available, and cloud data state and metadata state both indicate that the object is available. The second row corresponds to the "fail" state.

FIG. 5B illustrates such validation for scenario 502, where the resource type is a LUN and the snapshot shipping status is data file D3 and metadata file M3 are in progress. Table 520 illustrates the DB, cache and cloud validations. The first row corresponds to the DB validation where the data state and metadata state both indicate no record is found and the validation status is pass. The cache validation has multiple sub-scenarios. The first sub-scenario is where the data state indicates there is no cached file for D3 and the metadata state indicates there is no cached file for M3. This results in a validation status of pass, where cache and cloud data and metadata objects are initialized. If the end of data is reached, commit and exit are performed. The second sub-scenario is where the data state is there is one cached file (e.g., less than 5 MB) for D3 and the metadata state indicates there is no cached file for M3. This results in a validation status of pass, where cache and cloud data and metadata objects are initialized. The existing cached file for D3 is trimmed or deleted. If the end of data is reached, commit and exit are performed. The third sub-scenario is where the data state and metadata state indicate cached files. This results in a validation status of pass, where cache and cloud data and metadata objects are initialized. The existing cached files are trimmed or deleted. If the end of data is reached, commit and exit are performed.

The second row of table 520 corresponds to the DB validation where the data state indicates parts uploaded for D3 and M3. This results in DB validation fail status.

The third row of table 520 corresponds to the DB validation where the data state indicates parts uploaded for D3 and M3 is committed. This results in a DB validation fail status.

The fourth row of table 520 corresponds to the DB validation where the data state indicates D3 is committed and the metadata state indicates M3 is cached. This results in DB validation status of pass. The cache validation data state ensures that no cache files are available. If cache files are available, the task fails. The cache validation metadata state indicates M3 is cached, which results in a cache validation status of pass where the cache and cloud metadata object is initialized. This is already end of data, so the task continues with commit and continue. The cloud validation data state is object available and the cloud validation status is pass.

The fifth row of the table 520 corresponds to the DB validation where the data state indicates D3 is committed and the metadata state indicates parts of M3 are uploaded. This results in DB validation status of pass. The cache validation data state ensures that no cache files are available. If cache files are available, the task fails. The cache validation metadata state indicates M3 is cached or purged, which results in a cache validation status of pass where the cache and cloud metadata object are initialized. The uploaded parts (e.g., P1 and P3) for the metadata are obtained, and purge is ensured on all uploaded parts (e.g., P3). The failed intermittent parts (e.g., P2) are uploaded. This is already end of data, so the task continues with commit and continue. The cloud validation data state is object available, the cloud validation metadata state is the upload list (e.g., P1 and P3), and the cloud validation status is pass.

The sixth row of the table 520 corresponds to the DB validation where the data state indicates D3 is committed and the metadata state indicates M3 is committed. This results in DB validation status of pass. The cache validation data state and metadata state ensure that no cache files are available. If cache files are available, the task fails. The cache validation status is pass and the task continues. The cloud validation data state and metadata state are both object available and the cloud validation status is pass.

For Approach 2, the resume operation proceeds as follows. First, a multi-part upload list is obtained using an upload identifier (ID), where the multi-part upload list is [P1, P2, P3, P5]. Next, the cached metadata file on the CTA is updated (e.g., from [P1, P2, P5] to [P1, P2, P3, P5]). A resume snapshot differential is then computed between the original snapshot differential (e.g., for the snapshot being shipped to the cloud storage) and the cached metadata in the CTA. A commit is then performed for the uploaded data (e.g., for P3 with the intermittent status). A commit is also performed for the metadata using the updated cached metadata file. Resume then proceeds for the remaining parts [P4, P6, P7, P8, P9, P10] for creating new objects in the cloud storage.

Approaches 1 and 2, in some embodiments, include common specifications. For example, clouds hosting the cloud storage (e.g., to which snapshots are being shipped) implement cloud adapters for getting the multi-part upload list. Further, a cloud object cleanup is implemented for when a task is re-run or where a resume task fails with a hard error. Approaches 1 and 2 may also implement a global memory cap to avoid crashes (e.g., in case of a consistency group (CG), where the global memory cap may be a two-dimensional array for a maximum of 100 LUNs in a CG).

Approaches 1 and 2 each have various advantages. Approach 1, for example, keeps data files cached in the CTA which can be re-used for uploading missing parts during a resume operation without having to re-read the data from the originating storage array (e.g., which may include re-reading iSCSI data followed by applying any desired compression or encryption). Approach 1 also allows the same cloud object to be re-used for the resume operation, and sending the request doesn't have to hold in a buffer (e.g., the cache data filename can be used). Approach 1, however, does require handling of multiple data files in the cache and implementation of a cleanup process for the data files. In addition, Approach 1 may depend on the use of software such as an SQLite relational database management system (e.g., SQLite library and SQLite file handling). Approach 2, in contrast, eliminates the need for the CTA to load data files from the cache which can result in faster processing and avoid defragmentation issues. Approach 2 may also have a simplified cleanup process and may not require SQLite file handling software.

Approach 2, however, does require creating multiple cloud objects for each resume and implementing an archive concept without using cache files (a data queue part may already be implemented). Approach 2 also requires processing of cached metadata files based on the result returned from getting the multi-part upload from the cloud storage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for resuming copying of snapshots from a storage system to cloud storage will now be described in greater detail with reference to FIGS. 6 and 7. Although described in the context of system 100, these platforms may also be used to implement at least portions of other information processing systems in other embodiments.

Figure 6:
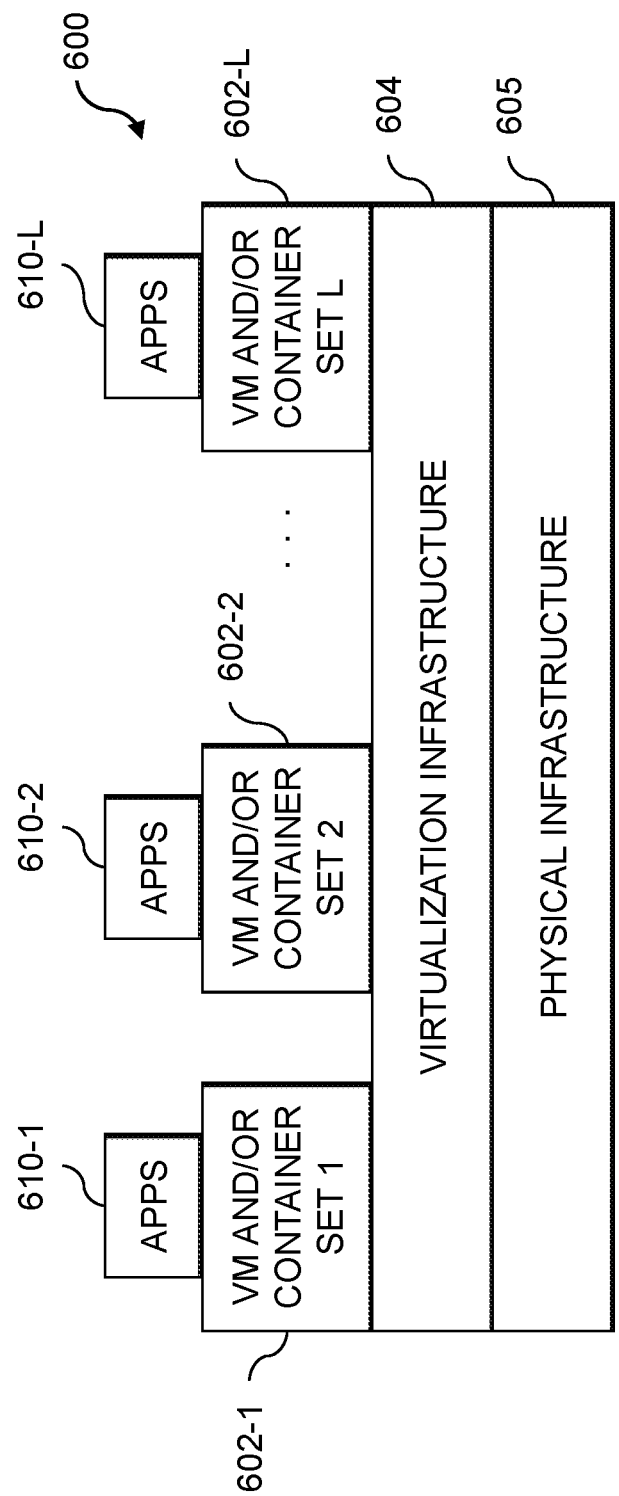
FIGS. 6 and 7 show examples of processing platforms that may be utilized to implement at least a portion of an information processing system in illustrative embodiments.
Figure 7:
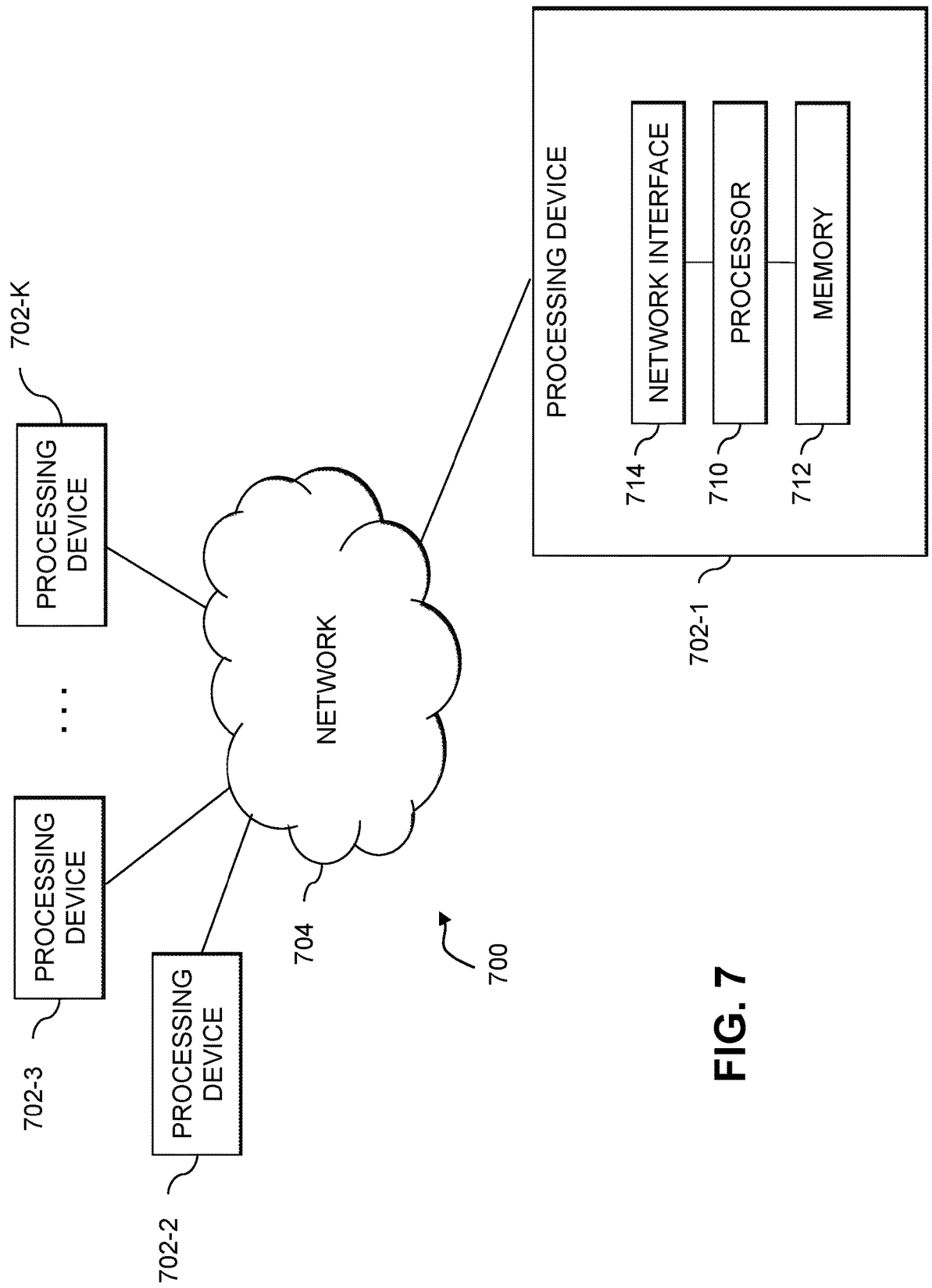

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for resuming copying of snapshots from a storage system to cloud storage as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, snapshot validations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to detect a request to resume copying of at least one snapshot of a storage volume from a storage system to cloud storage of at least one cloud external to the storage system;
   to determine an original snapshot differential for the at least one snapshot, the original snapshot differential comprising differential data of the storage volume on the storage system that forms the at least one snapshot;
   to obtain checkpointing information for the at least one snapshot from a checkpointing cache associated with the at least one processing device, the checkpointing information characterizing a status of copying one or more portions of the at least one snapshot to the cloud storage;
   to generate a resume snapshot differential for the at least one snapshot, the resume snapshot differential comprising at least one portion of the at least one snapshot that is to be copied to the cloud storage, the at least one portion of the at least one snapshot that is to be copied to the cloud storage being determined based at least in part on a comparison of the original snapshot differential with the checkpointing information characterizing the status of copying the one or more portions of the at least one snapshot to the cloud storage; and
   to resume copying of the at least one snapshot from the storage system to the cloud storage utilizing the resume snapshot differential.

2. The apparatus of claim 1 wherein detecting the request to resume copying of the at least one snapshot from the storage system to the cloud storage comprises obtaining, from the cloud storage, information characterizing one or more cloud object parts stored in the cloud storage for the at least one snapshot.

3. The apparatus of claim 2 wherein the information characterizing the one or more cloud object parts stored in the cloud storage for the at least one snapshot comprises, for a given one of the one or more cloud object parts, a size of the given cloud object part.

4. The apparatus of claim 3 wherein the checkpointing information characterizing the status of copying the one or more portions of the at least one snapshot to the cloud storage comprises, for a given one of the one or more portions of the at least one snapshot, a size of the given portion of the at least one snapshot.

5. The apparatus of claim 4 wherein generating the resume snapshot differential comprises comparing the size of the given cloud object part and the size of the given portion of the at least one snapshot and, responsive to determining that the size of the given cloud object part is not the same as the size of the given portion of the at least one snapshot, removing the given cloud object part from the cloud storage and adding the given portion of the at least one snapshot to the resume snapshot differential.

6. The apparatus of claim 4 wherein generating the resume snapshot differential comprises comparing the size of the given cloud object part and the size of the given portion of the at least one snapshot and, responsive to determining that the size of the given cloud object part is the same as the size of the given portion of the at least one snapshot, updating the checkpointing information in the checkpointing cache to indicate that the given portion of the at least one snapshot has been successfully copied to the cloud storage and removing the given portion of the at least one snapshot from the resume snapshot differential.

7. The apparatus of claim 1 wherein the at least one snapshot is copied from the storage system to the cloud storage utilizing at least one multi-part upload associated with at least one upload identifier, and wherein detecting the request to resume copying of the at least one snapshot from the storage system to the cloud storage comprises obtaining a multi-part upload list from the cloud storage, the multi-part upload list indicating at least a subset of the portions of the at least one snapshot that have been copied to the cloud storage.

8. The apparatus of claim 1 wherein the at least one processing device is further configured, prior to generating the resume snapshot differential, to validate a state of the checkpointing information in the checkpointing cache.

9. The apparatus of claim 8 wherein validating the state of the checkpointing information in the checkpointing cache comprises, for a given portion of data of the at least one snapshot:
  determining whether the given portion of the data of the at least one snapshot is at least one of cached in the checkpointing cache, uploaded to the cloud storage, and committed to the cloud storage; and
  determining whether metadata associated with the given portion of the data of the at least one snapshot is at least one of cached in the checkpointing cache, uploaded to the cloud storage, and committed to the cloud storage.

10. The apparatus of claim 1 wherein the at least one processing device is further configured to store, in the checkpointing cache, at least a portion of data of the at least one snapshot copied from the storage system.

11. The apparatus of claim 10 wherein copying of the at least one snapshot from the storage system to the cloud storage comprises compressing the differential data of the storage volume, and wherein the portion of the data of the at least one snapshot stored in the checkpointing cache comprises compressed data of the at least one snapshot.

12. The apparatus of claim 10 wherein copying of the at least one snapshot from the storage system to the cloud storage comprises encrypting the differential data of the storage volume, and wherein the portion of the data of the at least one snapshot stored in the checkpointing cache comprises encrypted data of the at least one snapshot.

13. The apparatus of claim 1 wherein the storage volume comprises one of:
  at least one of one or more storage devices of the storage system;
  a given logical unit provided by at least one of the one or more storage devices;
  a consistency group comprising a set of two or more logical units provided by at least one of the one or more storage devices; and
  an access-restricted storage group comprising a set of two or more logical units provided by at least one of the one or more storage devices where access to the storage group is limited to one or more designated host devices.

14. The apparatus of claim 1 wherein the at least one processing device is implemented external to the storage system.

15. A computer program product comprising a non-transitory processor-readable storage medium having stored therein program code of one or more software programs, wherein the program code when executed by at least one processing device causes the at least one processing device to perform steps of:
  detecting a request to resume copying of at least one snapshot of a storage volume from a storage system to cloud storage of at least one cloud external to the storage system;
  determining an original snapshot differential for the at least one snapshot, the original snapshot differential comprising differential data of the storage volume on the storage system that forms the at least one snapshot;
  obtaining checkpointing information for the at least one snapshot from a checkpointing cache associated with the at least one processing device, the checkpointing information characterizing a status of copying one or more portions of the at least one snapshot to the cloud storage;
  generating a resume snapshot differential for the at least one snapshot, the resume snapshot differential comprising at least one portion of the at least one snapshot that is to be copied to the cloud storage, the at least one portion of the at least one snapshot that is to be copied to the cloud storage being determined based at least in part on a comparison of the original snapshot differential with the checkpointing information characterizing the status of copying the one or more portions of the at least one snapshot to the cloud storage; and
  resuming copying of the at least one snapshot from the storage system to the cloud storage utilizing the resume snapshot differential.

16. The computer program product of claim 15 wherein the at least one snapshot is copied from the storage system to the cloud storage utilizing at least one multi-part upload associated with at least one upload identifier, and wherein detecting the request to resume copying of the at least one snapshot from the storage system to the cloud storage comprises obtaining a multi-part upload list from the cloud storage, the multi-part upload list indicating at least a subset of the portions of the at least one snapshot that have been copied to the cloud storage.

17. The computer program product of claim 15 wherein the program code when executed further causes the at least one processing device, prior to generating the resume snapshot differential, to perform the step of validating a state of the checkpointing information in the checkpointing cache, wherein validating the state of the checkpointing information in the checkpointing cache comprises, for a given portion of data of the at least one snapshot:
    determining whether the given portion of the data of the at least one snapshot is at least one of cached in the checkpointing cache, uploaded to the cloud storage, and committed to the cloud storage; and
    determining whether metadata associated with the given portion of the data of the at least one snapshot is at least one of cached in the checkpointing cache, uploaded to the cloud storage, and committed to the cloud storage.

18. A method comprising steps of:
    detecting a request to resume copying of at least one snapshot of a storage volume from a storage system to cloud storage of at least one cloud external to the storage system;
    determining an original snapshot differential for the at least one snapshot, the original snapshot differential comprising differential data of the storage volume on the storage system that forms the at least one snapshot;
    obtaining checkpointing information for the at least one snapshot from a checkpointing cache associated with at least one processing device, the checkpointing information characterizing a status of copying one or more portions of the at least one snapshot to the cloud storage;
    generating a resume snapshot differential for the at least one snapshot, the resume snapshot differential comprising at least one portion of the at least one snapshot that is to be copied to the cloud storage, the at least one portion of the at least one snapshot that is to be copied to the cloud storage being determined based at least in part on a comparison of the original snapshot differential with the checkpointing information characterizing the status of copying the one or more portions of the at least one snapshot to the cloud storage; and
    resuming copying of the at least one snapshot from the storage system to the cloud storage utilizing the resume snapshot differential;
    wherein the method is performed by the at least one processing device, the at least one processing device comprising a processor coupled to a memory.

19. The method of claim 18 wherein the at least one snapshot is copied from the storage system to the cloud storage utilizing at least one multi-part upload associated with at least one upload identifier, and wherein detecting the request to resume copying of the at least one snapshot from the storage system to the cloud storage comprises obtaining a multi-part upload list from the cloud storage, the multi-part upload list indicating at least a subset of the portions of the at least one snapshot that have been copied to the cloud storage.

20. The method of claim 18 further comprising, prior to generating the resume snapshot differential, validating a state of the checkpointing information in the checkpointing cache, wherein validating the state of the checkpointing information in the checkpointing cache comprises, for a given portion of data of the at least one snapshot:
    determining whether the given portion of the data of the at least one snapshot is at least one of cached in the checkpointing cache, uploaded to the cloud storage, and committed to the cloud storage; and
    determining whether metadata associated with the given portion of the data of the at least one snapshot is at least one of cached in the checkpointing cache, uploaded to the cloud storage, and committed to the cloud storage.

\* \* \* \* \*